US010962470B1

(12) United States Patent
Saraf et al.

(10) Patent No.: US 10,962,470 B1
(45) Date of Patent: Mar. 30, 2021

(54) MEASUREMENT OF LOCAL ELECTROCHEMICAL PROCESS BY DIFFERENTIAL REFLECTOMETERY

(71) Applicants: Ravi Saraf, Lincoln, NE (US); Abhijeet Prasad, Atlanta, GA (US)

(72) Inventors: Ravi Saraf, Lincoln, NE (US); Abhijeet Prasad, Atlanta, GA (US)

(73) Assignee: Ravi Saraf, Lincoln, NE (US)

( * ) Notice: Subject to any disclaimer, the term of this patent is extended or adjusted under 35 U.S.C. 154(b) by 313 days.

(21) Appl. No.: 15/914,474

(22) Filed: Mar. 7, 2018

(51) Int. Cl.
*G01N 21/21* (2006.01)
*G01N 21/552* (2014.01)

(52) U.S. Cl.
CPC ......... *G01N 21/211* (2013.01); *G01N 21/552* (2013.01); *G01N 2201/06113* (2013.01)

(58) Field of Classification Search
None
See application file for complete search history.

(56) References Cited

U.S. PATENT DOCUMENTS

| | | | | |
|---|---|---|---|---|
| 4,631,116 A * | 12/1986 | Ludwig | ................. | G01N 27/42 204/434 |
| 5,483,337 A * | 1/1996 | Barnard | ................. | G01N 21/68 356/316 |
| 7,561,282 B1 * | 7/2009 | Widmann | ........... | G03F 7/70625 356/401 |
| 2009/0316157 A1 * | 12/2009 | Saraf | ...................... | C25D 21/12 356/450 |
| 2011/0272295 A1 * | 11/2011 | Lee | ..................... | G01N 27/3272 205/792 |

* cited by examiner

*Primary Examiner* — Matthew D Krcha
(74) *Attorney, Agent, or Firm* — William L. Botjer

(57) ABSTRACT

Apparatus and methodology to measure the amplitude of oscillation of differential reflectivity from an electrode surface in contact with liquid with dissolved ions upon applying an oscillatory potential between the said electrode and the said liquid, where the differential reflectivity is a set of optical properties comprised of a change in intensity and phase of the oscillation of reflected light intensity relative to the incident light and a change in polarization of the reflected light. Analysis of the reflected beam may be used to determine various parameters of the electrochemical processes.

13 Claims, 13 Drawing Sheets

MEASUREMENT OF LOCAL ELECTROCHEMICAL PROCESS BY DIFFERENTIAL REFLECTOMETERY

This application claims priority from U.S. provisional application Ser. No. 62/470,103 filed Mar. 10, 2017.

BACKGROUND OF THE INVENTION

1. Field of the Invention

The present invention relates to a device to measure local electrochemical reaction on an electrode surface by measuring the change in reflectivity of a laser beam as the potential of the electrode relative to the solution is oscillating. The invention is to determine the redox potential and relative amount of the redox moiety undergoing electrochemical reaction at the electrode on the microspot being illuminated by the laser. The largest dimensions of the spot may be of a typical diameter of less than 1000 μm, preferable below 50 μm. The change in reflectivity occurs due to oscillation of the ionic environment at the electrode/solution interface due to the electrochemical process. The change in reflectivity may be by less than 10%, typically well below 1%. The electrode, called the working electrode (WE) may be an electrically conducting or semiconducting material. At the wavelength of the laser, the reflectivity of the electrode is at least 50%, preferably higher than 90%.

The electrode surface may be modified to enhance the redox reaction or improve specificity of the reactions of certain chemical species in the milieu of other chemicals in the solution. The surface modification may be patterned to modulate the nature of the redox reaction over the electrode. The modification of the electrode, well known to those in the art, may be a film composed of a coating of compounds, such as polyelectrolytes, conducting polymers, enzymes, DNA, nanomaterials, or adsorbed or tethered organic molecules. Combinations may also be possible, for example, nanomaterials, such as nanotubes, nanorods, nanosheets, or nanoparticles of carbon or inorganic materials, may be codeposited with polyelectrolytes. Those in the art will appreciate that patterning of the modification may be accomplished by using the standard photolithography method where the photoresist is selectively etched to expose part of the underlying electrode which may be locally modified by the abovementioned compounds.

Those in the art will appreciate that the surface of the electrode may be patterned using soft lithography where compounds for surface modification may be transferred by using a stamp made of a soft polymer, such as poly(dimethyl siloxan) (PDMS). Redox active moiety (or moieties) may be in solution, incorporated on the electrode as an adsorbed layer, or incorporated in the surface modification, or at both locations. The principle of the invention is to measure periodic change in reflectivity as the WE is subjected to an oscillatory potential with respect to the solution. The periodic nature of the applied potential, will allow measurement of reflectivity changes well below 1%, more typically below 0.1%. The measurement of small changes in reflectivity by the invented differential reflectometer will allow detection of redox reactions mediated by less than $10^{15}$ molecules, typically below $10^5$ molecules or 1 attomole. By scanning the laser beam over the electrode, changes in electrochemical reaction corresponding to local modification of the electrode may be mapped. The reflectivity may be measured by the laser beam being perpendicular to the electrode surface or at an incident angle, θ of less than 85° with respect to the normal of the electrode. The laser may be polarized to measure changes in the polarization and ellipticity of the reflected light with respect to the incident light for conditions of θ≠0.

2. Description of Related Art

The conventional method of probing electrochemical reactions at the working electrode (WE) is by measuring the current due to redox reaction. Among several amperometric approaches, a quantitative approach is called voltammetry, using a potentiostat that measures the reaction rate, i.e., the current as a function of applied potential between the WE and the solution. The method, practiced for decades, is called cyclic voltammetry (CV), requiring three electrodes: working electrode (WE), reference electrode (RE), and counter electrode (CE). In a typical experiment, a cyclic V-shaped potential, E, is applied between the WE and RE; and the current, I, between the WE and CE is measured as a function of applied cyclic potential. The RE is a very high impedance electrode such that the current through the electrode is negligible. The magnitude of the current peaks at certain potentials. From the maximum, the concentration of redox molecules may be obtained. From the location of the potential where the current peaks, the thermodynamic redox potential, $E^O$, of the molecule may be obtained. Because the signature of a particular redox ion (from $E^O$) and its amount (from the maximum current) is possible to measure, electrochemical methods are pervasive analytical and sensing tools. The applications are too numerous to enumerate here.

An important aspect of the invention is to map more than one local redox reaction on a WE by scanning the laser probe beam over the said electrode. Several approaches have been developed to measure local electrochemistry. The scanning electrochemical microscope is a device where a small micron to nanoscale-size electrode is scanned over the sample to serve as a local electrode to couple with the underlying (large) electrode (the sample) to measure redox reaction on the latter. The principle and application of the device is well reviewed in the literature.

Another set of devices to measure local electrochemical reaction are based on surface plasmon resonance (SPR). In this approach, the change in reflectivity due to electrochemical reaction at the surface that occurs due to SPR is measured. An approach to measuring local electrochemistry has been developed using modulation in the refractive index at the interface due to the redox reaction causing the SPR condition to change. Local redox on an electrode has been shown using an interferometric microscope.[4] Electroreflectance spectroscopy has been shown to measure local electrochemical reaction of adsorbed redox molecules.

The invented device describes a method to measure electroreflectance during an electrochemical reaction. Several patents have described application of electroreflectance. Afronmowitz described a reflectance apparatus to measure local electric field using an electroreflective material using fiber-optics (Afronmowitz, U.S. Pat. No. 4,730,109 A). Pollak describe an apparatus to measure surface composition of semiconductor compound using modulation of electroreflectance of a polyelectrolyte (Pollak et al. U.S. Pat. No. 4,142,802). Pollak described an apparatus to measure the electroreflectance spectrum of semiconducting materials using a condenser-like system (Pollak et al., U.S. Pat. No. 5,287,169 A). Lambert described a method to perform vibrational spectroscopy of adsorbed molecules on a surface using modulation of reflectance due to an oscillating electric field (Lambert, U.S. Pat. No. 4,446,719 A). Zhang et al.

described an apparatus to image microstructures using modulated reflectance spectroscopy (Zhang et al., U.S. Pat. No. 5,991,044 A). Saraf et al. described a method to measure local redox reaction using a differential interferometer (Saraf et al. U.S. Pat. No. 7,826,060 B2).

Electrochemical sensors are perhaps the most common chemical sensors in the industry owing to their high specificity and versatility. However, only one redox reaction can be measured on a monolith electrode. Thus, there is need in the art for a detection method that would allow measurement of multiple redox reactions on a monolith electrode surface at high sensitivity and high specificity. The invention described addresses this limitation by developing a method that can measure a local electrochemical redox reaction on a microspot defined by a probe laser beam. By scanning a laser beam, multiple reactions on a monolith electrode can be measured.

SUMMARY OF THE INVENTION

In general, the reflectivity of the laser beam is dependent on the magnitude and the gradient of the refractive index at the electrode/solution interface. A gradient of ion concentration spontaneously forms due to the difference in electrochemical potential (or Fermi level) between the electrode surface (including the modification) and the solution. This interfacial gradient is referred to as the electrical double layer (EDL). On application of an oscillatory potential between the WE and RE, the ion concentration distribution in the interfacial layer will oscillate leading to oscillation of the refractive index gradient causing the reflectivity to oscillate. The invention pertains to measuring change in the reflectivity, $\Delta R$, by well below 1%, typically below 0.1%, due to the oscillatory potential. For convenience in this document, $\Delta R$ will be replaced by R. It is understood in this document that the reflectivity is differential reflectivity, i.e., the amplitude of the oscillation in the reflectivity. Furthermore, the invention pertains to measuring the phase of the oscillatory reflectivity, $\phi$, with respect to the applied oscillatory potential on the WE. If the linearly polarized incident laser beam with electric field amplitude, $S_0$, is at an angle, $\theta$, from the normal of the WE surface, the reflected beam will change to elliptically polarized light. Those in the art will appreciate that in elliptic polarized light, the electric field perpendicular to the direction of propagation of the light can be represented as the superposition of two mutually perpendicular components of amplitudes $S_1$ and $S_2$ with a phase difference of $\alpha$ such that the electric field traces an ellipse as it propagates. In this document, it is arbitrarily assumed that $S_1$ and $S_2$ are along the major and minor axes of the ellipse, respectively, i.e., $S_1 \geq S_2$. For this invention, and subsequently in this document, it should be emphasized that $S_1$ and $S_2$ are the amplitude of the oscillation of the electric field along the major and minor axes; and $\alpha$ is the amplitude of oscillation of the phase difference between the electric fields along the major and minor axes. For $\theta \neq 0$, the invention pertains to measuring the amplitude of the oscillatory change in ellipticity as defined by two parameters, $P=S_1/S_2$ and $\alpha$. It will be apparent to those of ordinary skill in the art that the oscillation in ellipticity is represented by $S_1/S_2$ and $\alpha$ caused by the oscillating interfacial ion concentration gradient. Those of ordinary skill in the art will appreciate that due to the oscillating potential, the gradient of the interfacial layer will become significantly thicker than the EDL thickness due to diffusion effects. As a result, the amplitude of reflectivity oscillation, the phase change, and the amplitude of oscillation of ellipticity will increase due to the oscillatory potential. Those of ordinary skill in the art will appreciate that the interfacial layer thickness will increase as the frequency of oscillating potential decreases. As a result, the signal may be dependent on the frequency of the applied oscillatory potential, information that may be useful in gaining a deeper understanding of the electrochemical phenomena.

For the invention, a typical oscillatory potential on the WE with respect to the solution (i.e., the RE) may have two potentials. The first potential is a base potential that may be either constant, or may be time dependent. Typically, the base potential is a slow ramp, that may typically be a "V-shaped" periodic ramp where, similar to the conventional CV, the potential rises and declines linearly between two set potential limits at a constant frequency say, $\omega_R$. The second potential may be a sine or cosine wave potential of frequency, $\omega$. The former is ramp potential at $\omega_R$, and the latter is probe-potential at $\omega$. The ramp potential, $E(t)$, where t it time, ramps over the range of interest covering the equilibrium redox potential, $E^O$. As a standard convention, oxidation occurs at potential $E-E^O>0$; and reduction occurs at $E-E^O<0$. Typically, the range for $E(t)$ may be within $-1$ to 1 V. Typically, the amplitude of the probe potential may be about fivefold smaller than the amplitude of the ramp potential. Typically, $\omega>10\omega_R$, preferably $\omega>100\omega_R$. Alternatively, another typical oscillatory potential may be a simpler potential profile, where only the probe potential is applied, i.e., the probe potential is the base potential applied. In this case, the probe potential is $E(t)$ with a large amplitude to cover the entire range of interest that includes the redox potential, $E^O$. In this document, the response of differential reflectivity for just the probe potential will subsequently be called the w-scan. It may also be that the base potential is constant, i.e., $\omega_R=0$. In other words the ramp potential is a DC potential fixed at a constant value. In this document, the time dependent base potential will subsequently broadly be called ramp potential.

The reason redox reaction is observed by the invented differential reflectometer is because the oscillations of the ions are enhanced in the vicinity of $E^O$.[6] As described in the first paragraph of this section, the oscillation of the ion concentration gradient causes the oscillation of the optical properties, i.e., R and $\phi$, and when $\theta \neq 0$, the ellipticity parameters, P and $\alpha$. Owing to the accumulation of charge in the interfacial gradient, the electric field, due to applied potential, is highly screened. As the potential, E, approaches $E^O$, redox reaction begins which disrupts the screening due to the electron exchange between the ions in the solution and the electrode. As a result, the electric field from the electrode penetrates deeper into the solution.[6] Thus, the amount of ion oscillation at w will increase in magnitude close to $E^O$ leading to a larger change in the magnitude of reflectivity making it possible to detect and characterize the redox reaction.

Two families of devices at $\theta \neq 0$ and $\theta=0$ with two different oscillatory potential conditions are described leading to four possible modes of measurement. (i) If both the probe and ramp potentials are applied and $\theta \neq 0$, all four optical parameters, R, $\phi$, P, and $\alpha$ may be measured. (ii) If only the probe potential is applied and $\theta \neq 0$, R and P may be measured. (iii) If both the probe and ramp potentials are applied and $\theta=0$, only R and $\phi$ will be measured. (iv) If only the probe potential is applied and $\theta=0$, only R will be measured. All of the measurement parameters will be a function of E. Those of ordinary skill in the art will appreciate that the modes of measurement, (i) to (iv), will depend on the electrochemical application. For example, if information on the thickness of the interfacial layer is required, $\theta \neq 0$ would be a more appropriate optical geometry. For example, if measurement on reaction kinetics on an electrode modified by redox moiety is of importance, $\theta=0$ with just the probe potential may be a good approach, i.e., the $\omega$-scan. Not limited by particular applications and withstanding an alteration in optics that is well appreciated by those in the art, all of the four modes combined constitute the scope of the invention. Each of the four modes stands as an individual functional device on its own.

To measure the optical properties mentioned above, two optical elements and one electronic module of the device are described to facilitate the discussion of the invention. (A) When $\theta \neq 0$, the optical beam path is designed with a focusing system where the reflected beam is focused back on a steering mirror to reflect the beam to an optical system to detect the intensity, phase, and polarization of the reflected beam. Those of ordinary skill in the art will appreciate that this arrangement, where the optical conjugate of the spot on the WE is on the steering mirror, has advantages in focusing and aligning the optics. After focusing back on the steering mirror, the reflected beam will be parallel to the path of the incident beam to keep the design convenient. Those in the art will appreciate that the above said conjugation is not a required feature of the invented device. (B) To measure the oscillation of ellipticity, the reflected beam after the steering mirror is diverted by a mirror, or more appropriately a half-mirror, through a biaxial crystal that splits the beam to two mutually perpendicular linearly polarized lights. An example of a biaxial crystal used in optical systems is a calcite crystal, and it is called a beam displacer. The biaxial crystal is designed such that the incident single beam is split into two parallel beams with linear polarization that are mutually perpendicular. Each beam may be measured independently on two respective photodetectors, preferably a "split-detector" on a single chip. To ensure that the beams are along the major and minor axes of the electric field ellipse, the biaxial crystal may be rotated around the beam direction to maximize the signal for the more intense beam. The more intense beam has electric field polarization along the major axis. (C) The signal from a single detector or the two detectors will be measured by a lock-in-amplifier that is tuned to probe potential frequency, $\omega$, as the reference signal. Those of ordinary skill in the art will appreciate that the output from the lock-in amplifier will measure $\phi$ directly. The lock-in amplifier may also measure the amplitude and corresponding phase of higher harmonics of light intensity oscillating at $n\omega$, where, $n=1, 2, 3, \ldots n_{max}$. The $n_{max}$ will depend on the fidelity of the lock-in amplifier, preferably $n_{max}$ is in the range of 7; at least 4 will be appropriate for high sensitivity measurement.

Specifically, the invention is a device to measure the following optical properties in an electrochemical system undergoing redox on a planar electrode with reflectivity higher than 50%, preferably >90% for the incident laser beam. The electrode may be conducting or semiconducting material. The electrode may be modified by adsorbed molecules, a thin film, or a monolayer of one or more type of tethered molecules. The modification of the electrode may be uniform, or nonuniform, such as in the form of a patterned array of micro- or macrospots. The material composition, process, and structure of surface modifications per se are not intrinsic to the described invention. It is understood, that there may be surface modification processes discovered and developed in the future that may apply to the invented measurement method described.

As will become apparent, the optical setup of the device is not unique but may be modified, depending on the application, to measure all or a subset of the four optical properties, R, $\phi$, P, and $\alpha$. The description given below consists of specifics to practice the measurement of the four optical properties and their subset. It is entirely possible that accomplishing the measurement of the four parameters may require alteration or modification of the the optics using known principles in the art. For example, the biaxial crystal may be replaced by an opto-electronic compensator. Those in the art will appreciate that the data acquisition and control can all be accomplished by interfacing the electronic module and opto-electronic elements in the invented device to a computer using well-known methods practiced in the scientific and technology community.

The specifics for measuring the optical properties, R, $\phi$, P, and $\alpha$ are now considered in reference to the four design modes (i) to (iv). For modes (iii) and (iv) where $\theta=0$, the ellipticity of the beam does not change. For this design, the biaxial crystal is not required. Only one detector is required. For mode (iii), both ramp and probe potentials are applied; and D and phase $\phi$ are measured as a function of E (i.e., the ramp potential) from the lock-in-amplifier at a reference frequency of $\omega$. As the lock-in-amplifier will be connected to the power supply that generates the probe potential, $\phi$ is directly measured. The reflectivity $R=(D/I)^{0.5}$, where I is the intensity of the incident light. Those of ordinary skill in the art will appreciate that the measurement of I using the photodetector is straight forward. For example, I may be measured directly as a DC component from the amplifier of the photodetector. For mode (iv) with only the probe potential, i.e., $\omega$-scan, signal amplitude, and phase, at several harmonics, $D_n$, and $\phi_n$ at $n\omega$ may be measured by the lock-in-amplifier. The $n_{max}$ is preferred to be 7 and should be at least 4. Those of ordinary skill in the art will appreciate that by summing the various harmonics with the corresponding phase, the amplitude, D, as a function of E can be obtained. The reflectivity may then be calculated as, $R=(D/I)^{0.5}$. For modes (i) and (ii), where $\theta \neq 0$, the calcite crystal will be included to measure ellipticity. For mode (i), with both ramp and probe potentials, the signal $(D_1, \phi_1)$ and $(D_2, \phi_2)$ may be obtained from the two detectors using two independent lock-in amplifiers connected to each photodetector. Each signal from each lock-in amplifier will have the same reference probe potential at $\omega$. The biaxial crystal is rotated such that $(D_1, \phi_1)$ and $(D_2, \phi_2)$ correspond to major and minor axes, respectively. The phase may be arbitrarily defined with respect to the major axis such that $\phi=\phi_1$. The reflectivity, R, may be estimated as $R \sim [(D_1+D_2)/(2I)]^{0.5}$. The ellipticity parameters $P \sim (D_1/D_2)^{0.5}$ and $\alpha = \phi_2 - \phi_1$. Those of ordinary skill in the art will appreciate that the same analysis may be performed by defining the minor axis as the reference. The analyzed data will be R, $\phi$, P, and $\alpha$ as a function of E. For mode (ii) with only probe potential at $\omega$, similar to mode (iv), the first to the fourth harmonic, or preferably the first to the seventh harmonic of amplitude and phase on each detector will be detected using the lock-in amplifier operating as the probe potential as the reference. Similar to mode (iv), those of ordinary skill in the art will appreciate that by summing the various harmonics with the corresponding phase, the amplitude, $D_1$ and $D_2$, as a function of E may be obtained from each detector, respectively. The reflectivity, $R \sim [(D_1+D_2)/(2I)]^{0.5}$ and $P \sim [D_1/D_2]^{0.5}$, may be obtained as a function of E.

The theoretical modeling to further quantify the electrochemical process from the optical parameters, R, $\phi$, P, and $\alpha$ may be obtained by principles and theories published in the literature. For completeness, a brief reference will be made to possible approaches that are well described in the scientific literature. The concentration profile in the equilibrium EDL is well studied and described in the literature. To model the changes due to the applied oscillatory potential, the essential equations involved in the formulation are Boltzmann-Poisson's equation, Stoke-Einstein-Smoluchowski, Gauss's law and Fick's law. Based on the ion concentration profile at the interface, the refractive index gradient can be computed using, for example, the Lorentz-Lorenz equation and Clausius-Mossotti equations. From the refractive index gradient, it is possible to calculate the reflectivity and ellipticity of the light using Fresnel's equations. Those in the art will appreciate that the sophistication of the theoretical analysis may significantly increase by, for example, considering that ions have size and shape, interionic interaction and hydration with water. The calculation may be performed for each E to extract information on the electrochemical process. The theory is not part of the invention and should be construed as merely an added analysis to gain deeper insight from the measurement of optical parameters from the invented differential reflectometer.

BRIEF DESCRIPTION OF THE DRAWINGS

The accompanying drawings, which are incorporated in and constitute a part of this specification, illustrate one embodiment of the invention and together with the written description serve to explain certain principles and features of the invention.

DETAILED DESCRIPTION OF PREFERRED

Embodiments of the Invention

Reference will now be made in detail to various exemplary embodiments of this invention, examples of which are illustrated in the accompanying drawings. The following detailed description should not be understood as a limitation on the scope of this invention but should rather be considered as it is intended-to provide details on certain features and aspects of the invention. This invention has two families of devices where the laser beam to measure local reflectometry is either perpendicular to the WE surface (θ=0) (FIG. 1(a)) or at an angle (θ≠0) (FIG. 1(b)). The redox at the WE electrode for each device may be regulated by an oscillatory potential composed of ramp and probe potential or just the probe potential. The combined optical and oscillatory potential conditions lead to four modes of operation.

Figure 1A:
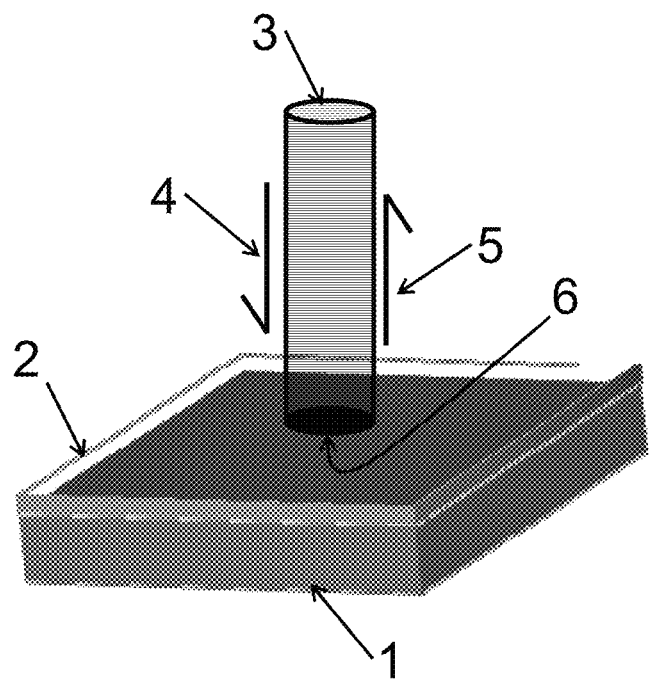
FIGS. 1a and 1b: Illustrates the parameter defining the reflection conditions at the electrode surface, for (a) θ=0 and (b) θ≠0.
Figure 1B:
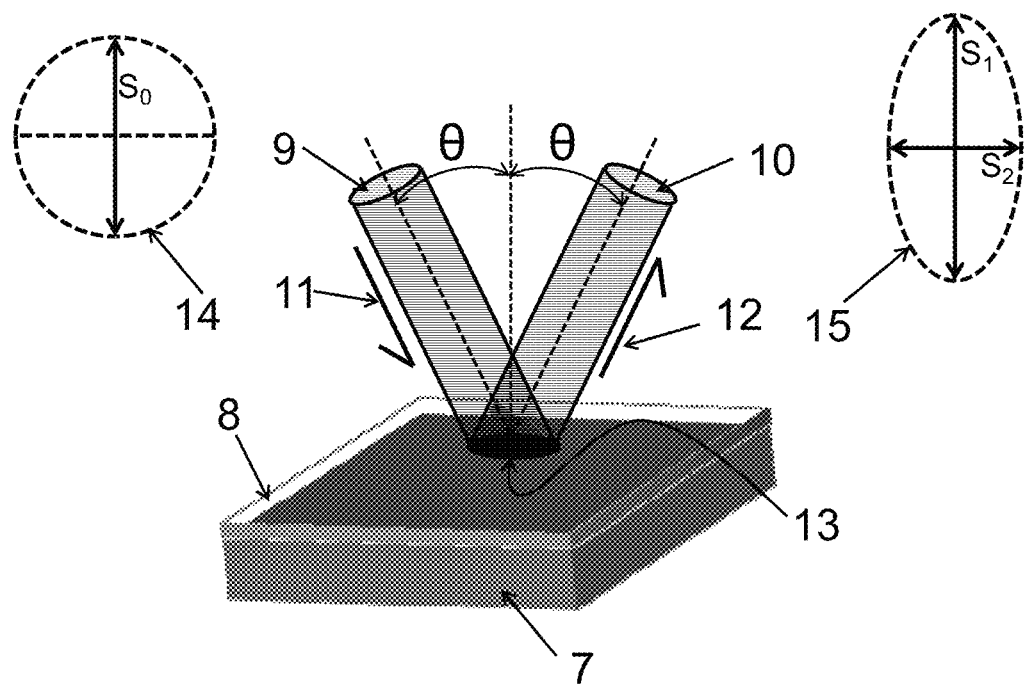

To illustrate the two device families for the invention, a conceptual illustration is schematically shown in FIG. 1. The sample is the electrode (1,7) which may be modified (2,8), as will be described later in the section. The electrode is called the working electrode (WE). As the purpose of the illustration is to describe the concept of the two device families, details, such as the substrate underlying the electrode and the chamber to hold the liquid above the electrode with modification, is not shown. For the first device family (FIG. 1(a)), the incident laser beam's (3) downward direction (4) is normal to the surface of the WE (1); and the reflected beam (5) retraces the path of the incident beam. The redox reaction is measured on the microspot (6) defined by the area illuminated by the laser beam on the electrode. For the second device family (FIG. 1(b)), the electrode (7) is illuminated be an incident beam (9) at an angle θ≠0; and the reflected beam (10) does not retrace the path of the incident beam. The incident angle, 85≥θ≥0.01°, preferably θ≤55°. The direction of the incident (11) and reflected (12) beams are both at an angle θ with respect to the normal. The redox reaction is measured on the microspot (13) defined by the area illuminated by the the laser beam on the electrode (7). The main difference in this family compared to the device for θ=0 is that the polarization of the reflected and incident beams are an important consideration. For the linearly polarized incident beam with the electric field vector of amplitude, $S_0$, is in one direction, as shown in the electric field circle (14). It is understood that the electric field is perpendicular to the direction of propagation (11). On reflection, the light is elliptically polarized; defined by electric field amplitudes, $S_1$ and $S_2$, along the major and minor axes (15). With no loss in generality, for description purposes, the major axis is assumed to be the reference such that the minor axis electric field leads by a. Thus, the oscillating electric field in the major direction has a phase lag of a with respect to the electric field along the minor axis. Those in the art will appreciate that the incident light in general may be defined as elliptically polarized light.

Figure 2:
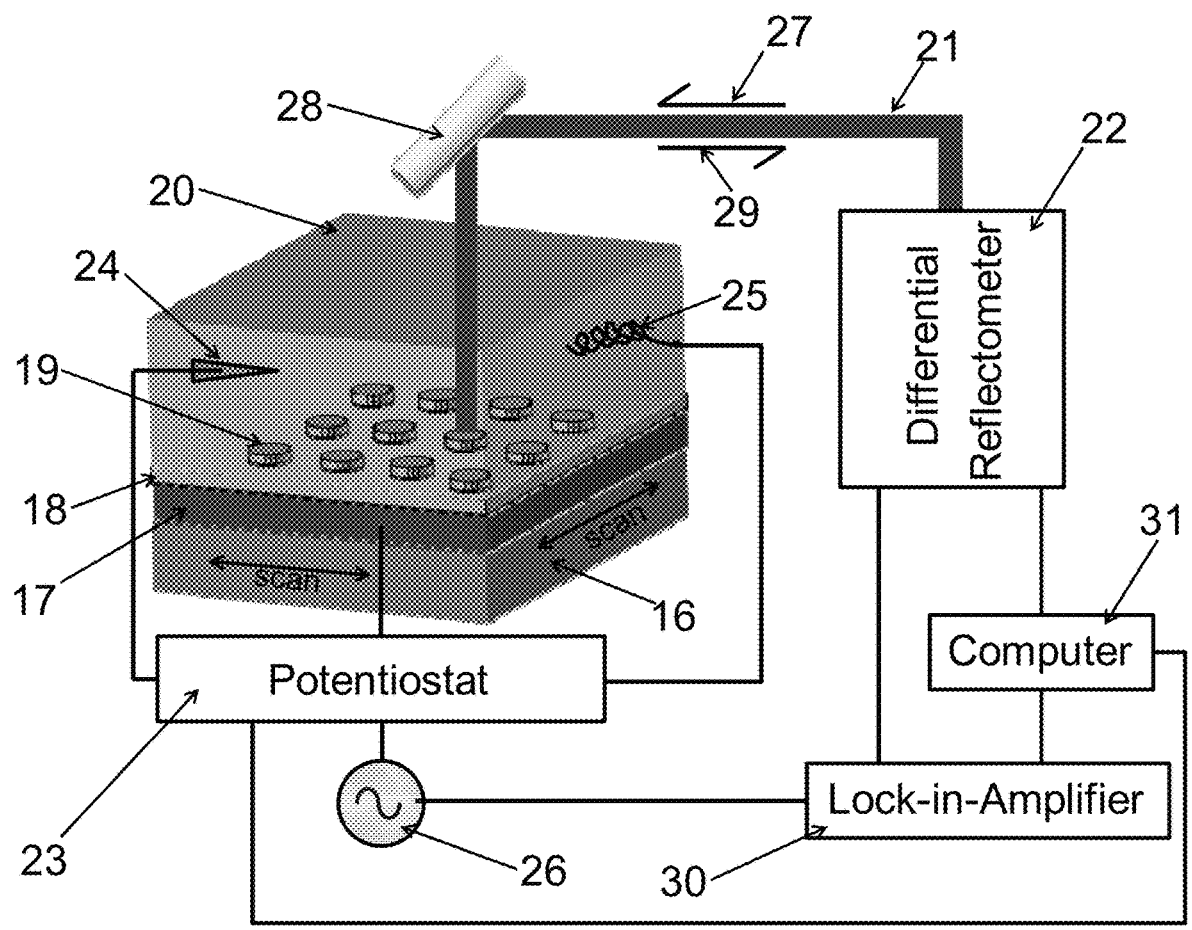
FIG. 2: Over all setup of the device showing the function of the reflectometer with respect to the sample (i.e., WE), electrochemical setup, the detection electronics, and the computer for data acquisition and control.

Next the electrochemical aspect is considered. To facilitate the description, a specific electrochemical setup is considered to demonstrate the the role of the invented device in relation to the salient components and their function. References will be made on alternatives to the setup while accomplishing the function of the invention. Those of ordinary skill in the art will appreciate that the electrochemical setup (FIG. 2) is a classic three-electrode arrangement driven by a potentiometer. The three electrode setup is not limited to the invention but merely used as an example to facilitate the description of the invention. For example, depending on the application, only two electrodes may be used with a power supply without using the potentiostat.

The sample (16-19) comprises three layers (16-18), and features (19) in the top layer (18) are immersed in a solution (20). The solution (20) may be a complex mixture of buffering agents and compounds exhibiting redox chemicals, as will be demonstrated below using a few specific examples. The solvent may be water or ionic liquid or high polar solvents that can dissolve ions. The details of the chamber holding the fluid with a window for the laser beam to interface with the reflectometer (22) is not shown. Those of ordinary skill in the art will appreciate that there may be several designs for the chamber, which does not add any critical information to the description of the invention. For example, one chamber design is published in the literature.[6] The lowest layer (16) is a substrate which may be a rigid or flexible dielectric solid that serves as a base of the sample structure. The substrate (16) may be a glass or a ceramic or a flexible material, such as a polymer sheet. The electrode (17) is deposited on the substrate. Those of ordinary skill in the art will appreciate that there are multiple deposition processes, for example, lamination of the electrode (17) in the form of thin film or foil using an adhesive; electroless plating of the electrode (17) on the substrate (16); a combination of electroless and electroplating of the electrode (17) on the substrate (16); and vapor or chemical vapor deposition of the electrode material on the substrate (16). Irrespective of the process, there are multiple methods to obtain the structure of the electrode deposited on the substrate. The electrode may be conducting or semiconducting material. It may be a metal, inorganic, or organic material. Those of ordinary skill in the art will appreciate that the electrode may be patterned or may be a blanket monolith coating. The patterning may be to facilitate interconnection of the electrode exposed to liquid (20) to external electronics. The electrode (18) may be metal alloy coated with a noble metal such as Au or Pt. The electrode (18) may be a conducting polymer deposited on a reflective substrate (16). Irrespective of the combination of well-known technologies known to those of ordinary skill in the art, the final structure must be highly reflective to the incident laser beam (21). If the is a transparent inorganic, such as indium-tin-oxide (ITO) or conducting polymer thin film, then the surface of the underlying substrate (16) must be reflective. The reflectivity of the substrate electrode or just the electrode surface should be at least 50%, preferably above 90%. The electrode surface, with modification, must be active for electrochemical reaction. If the electrode surface is not modified, then the surface must be active to facilitate electrochemical reaction. The details of the chemical composition and structure of the substrate/electrode layer are not the critical aspect of the invention as long as the function described above and its ability to facilitate a redox reaction is accomplished.

The electrode (17) may be modified (18). The modification is not necessary to operate the invented device; in many instances a modification would enhance the redox reaction in terms of characteristics such as rate of reaction and specificity. Those of ordinary skill in the art will appreciate that numerous modification strategies may be possible. Those of ordinary skill in the art will also appreciate that the number of possible surface modifications of electrodes documented in the literature are too many to enumerate here with the realization that modifications developed in the future may also be applicable without impacting the innovativeness of the device described. The modification of the electrode may be patterned (18,19) or may be a monolith uniform modification without the patterning. A brief description will now be given on some examples of the modification. A monolith modification may be adsorbed molecules, such as amine or carboxyl-containing compounds that may electrostatically adsorb on the conducting electrode, such as methylene blue (MB), that has redox properties that adsorb on a Au surface. The modification may be molecules that may bond to the electrode such that the molecule tethers to the electrode surface forming a monolayer, for example, thiol-terminated DNA, RNA, or proteins that will from a Au—S bond on a Au surface. The modification may be an adsorbed thin layer of polyelectrolyte, such as, poly(allyl aminne hydrogen chloride) (PAH), poly(styrene sulfonate) (PSS), DNA, RNA, and heparin. The polyelectrolyte will electrostatically adsorb on the conducting electrode by image charge. The layer may be by adsorption from solution or solution cast. Those in the art would appreciate that it is also possible to deposit composite film on different polyelectrolytes in a layer-by-layer process. Furthermore, ions that undergo redox reaction may be imbedded in the polyelectrolyte layer to form a redox film.[7] The polymer thin film coating with intrinsic redox properties may be used to modify the electrode surface. The electrode modification layer (18) could also also be a conducting polymer. The electrode modification may incorporate nanoscale materials, such as carbon nanotubes, graphene, nanoparticles, or nanorods of metallic and semiconducting material using standard fabrication methods described in the literature. The nanomaterials may directly serve as electrodes by depositing them on a reflective dielectric surface. For certain applications, the patterning may be performed where the modification is localized to certain isolated regions (19). Those of ordinary skill in the art will appreciate that the patterning may be by soft lithography, for example, a stamp of poly (dimethyl siloxane) (PDMS) with micron to submicron-scale features may be used to transfer material in a specific pattern on the electrode (17). The stamping by soft lithography may be of any of the abovementioned molecules, such as DNA or RNA with the thiol terminal group, polyelectrolytes, or small molecules, such as MB. The patterning may be by traditional photolithography practiced in the microelectronics industry where the modification layer (18) may be a photoresist that is deposited and patterned with etched features (19) to expose the underlying electrode surface. The exposed electrode surface may be modified by methods and materials similar to the ones described above for monolith modification. The details of the chemical composition and structure of the modification layer is not the critical aspect of the invention as long as the function described above and its ability to facilitate a redox reaction is accomplished.

To facilitate the discussion without limiting the possible electrochemical application of the invented device, two applications of sensors are briefly described. In the first example, the polyelectrolyte film of PSS and PAH may be impregnated with $[Fe(CN)_6]^{4-/3-}$ ions with the underlying electrode (17) being Au,[7] and the deposition in the features (19) is etched in a photoresist film (18) patterned by standard photolithography. The photoresist may be SU8. The solution (20) may contain a redox analyte dopamine. A convenient solvent for the solution (20) may be water. To control the redox environment, the solution (20) may be buffered using standard compounds. In a second example, with a similar photolithography process on a Au electrode, the underlying electrode may be modified with single-stranded DNA (ssDNA) terminated with thiol group. Those of ordinary skill in the art will appreciate that the thiol terminal will allow for the ssDNA immobilization on the Au electrode due to a strong Au—S bond. The unoccupied Au electrode sites around the tethered ssDNA may be backfilled by tethering an inert surfactant, such as mercaptohexanol (MCH). The tethered ssDNA is exposed to complementary ssDNA that forms an immunospecific binding leading to double-stranded DNA (dsDNA). The sample may be washed and exposed to solution (20) with methylene blue (MB) in the presence of a mediator redox ion, $[Fe(CN)_6]^{-4/-3}$. The MB dye specifically binds to dsDNA and undergoes redox on application of appropriate potential close to its redox potential, $E^O$. The presence of binding may be detected by measuring the redox of MB by application of appropriate oscillatory potential. Irrespective of the specific example, the primary aspect of the device is that it will map local electrochemical reaction at a monolith electrode surface that may be patterned with local surface modification or may be completely bare. For both of the examples, the analysis may be performed with the beam in either mode for $\theta=0$ or $\theta \neq 0$, using probe and ramp potential or just probe potential.

The solvent of the solution (20) may be water or any fluid that can dissolve ions. The presence of ion and high transparency of the solution is important to the invention. The redox molecule may be in the solution (20) or imbedded in the surface modified film described above or at both locations.

To describe the invention, the standard three-electrode arrangement well known to those in the art is used. A potential between the solution (20) and the electrode (17) is applied by a potentiostat (23) connected to the reference electrode (RE) (24) and the WE (17). For convenience, the solution is assumed to be at a fixed "ground-potential." The ground potential on the RE is maintained by the potentiostat (23). The potentiostat (23) may be programmed to apply a ramp potential plus an extra probe potential (26) to the electrode (17) maintaining the solution at ground. The RE is a high impedance device; as a result no current flows through the electrode. The redox current due to the reaction at the electrode, with or without modification, flows between the electrodes (17) and the counter electrode (CE) (25). In reference to the electrochemical application, the electrode (17) is referred to as the working electrode (WE).

Those of ordinary skill in the art will appreciate that the current may not be due to an oxidation or reduction reaction but capacitance current due to time varying oscillatory potential. Example will be given below to measure potential of zero charge (PZC) for an electrode and electrolyte system where no oxidation or reduction reaction occurs at the electrode. The ability to measure the maximum in magnitude of capacitive current leading to large reflectivity change can especially be used to measuring specific binding that does not require a redo reaction, such as an antibody-antigen binding. In another example involving proteins, differential reflectivity can measure protein binding activity involving redox reaction, for example, specific binding of molecules to immobilized enzyme to cause a redox reaction. In the example related to enzyme, no additional redox ion in the solution may be required.

The invention pertains to measuring the effect of local current on the microspot (6, 13) defined by the laser beam (21). Those in the art would appreciate the current between the WE (17) and CE (25) measured by the potentiostat (23) is the total current from the whole electrode. The incident beam (27) from the differential reflectometer is incident on the WE via a steering mirror (28). The location of the spot may be adjusted by translating the electrochemical system (16) in the horizontal plane. The reflected beam (29) is analyzed in the differential reflectometer (22) to measure all or a subset of the optical parameters, R, $\phi$, P, and $\alpha$ as a function of E, depending on the four modes. The oscillating signal due to the probe potential (26) on the detector in the reflectometer (22) is amplified by the lock-in amplifier (30) that is tuned at reference frequency of $\omega$ to filter any noise or ambient or background signal from the received signal and set at the reference potential from the probe potential power supply (26). All of the electronic modules in the reflectometer (22), lock-in amplifier (30), and the potentiostat (23) are interfaced with the computer (31) for control and data acquisition.

Figure 3:
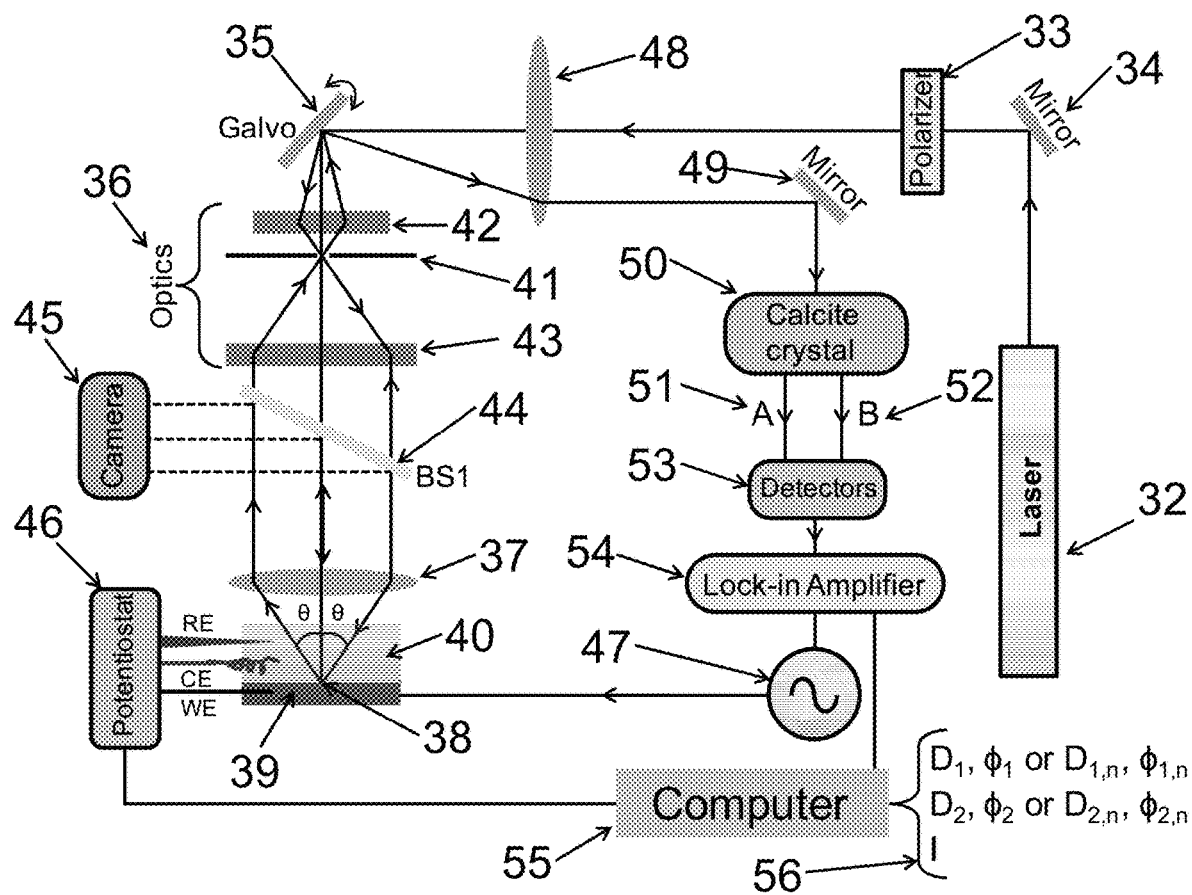
FIG. 3: Details of the differential reflectometer with complete electrochemical setup for the first family of devices with θ≠0 to operate the device in modes (i) and (ii).

The first family of devices is illustrated using one typical setup (FIG. 3). Notwithstanding any limitation, the specific setup is merely used to demonstrate the underlying principle and a mode of operation of the device. Those of ordinary skill in the art will appreciate that the alternative optical setup or modification of the described setup may be used to measure the optical parameters, such as, I, $D_1$, $\phi_1$, $D_2$, $\phi_2$ or I, $D_{1,n}$, $\phi_{1,n}$, $D_{2,n}$, $\phi_{2,n}$, where, the former set of parameters are for both probe and ramp potential and the latter is for only the probe potential. The subscript n refers to the order of harmonic measure by the lock-in amplifier for n=1, 2, 3 . . . $n_{max}$. The laser (32) used is He—Ne laser for convenience to illustrate the concept of the device. Those of ordinary skill in the art will appreciate that other lasers may be used. A continuous laser with a wave length in the visible region is more convenient. To ensure that the laser is linearly polarized, a polarizer (33) may be included in the beam path.

The laser beam may be steered through a set of mirrors (34,35) to focusing optics (36, 37) to focus the beam on a microspot (38) on the WE (39) in contact with solution (40). The WE (39) may be modified and patterned as described above; and the solution (40) may be a complex mixture of chemicals depending on the applications, as described above. To avoid confusion in the schematic, the details on the components of the sample, such as modification on the electrode, the chamber to hold the solution (40), and the window for the laser to enter and exit the solution chamber, are not shown.

To make the focus of the microspot (38) tight for better performance, the focusing optics (36) may have a pinhole (41). Using two lenses (42, 43) the beam is focused at the pinhole and collimated to the final focusing lens (37). The focusing lens (37) will focus the beam at the microspot (38) and refract the reflected beam to the optics (36). The optical system (36,37) may be designed such that the the focal spots on the microspot (38) and the steering mirror (35) are conjugate. The beam from the steering mirror (35) is guided to the detection system described later. The steering mirror (35) may be motorized, such as a galvo-mirror, to regulate the angle of incidence, $\theta$, on the WE (39). Those of ordinary skill in the art will appreciate that the conjugation point on the steering (galvo) mirror is on the axis of rotation so that the beam after the latter will shift parallel to the incident beam after the reflection from the mirror (see FIG. 3). Those of ordinary skill in the art will appreciate that the optics may be altered to accomplish the purpose described above. For example an objective lens may be used instead of a simple or compound lens (37). This may simplify the focusing optics (36). However the objective lens may limit the maximum possible $\theta$.

The location of the laser spot on the WE (38) may be visualized by an in built microscope. A beam splitter, BS1 (44) may be temporarily inserted in the beam path to partially deflect the light on a camera to image the microspot (38). As the beam is parallel, those of ordinary skill in the art would appreciate that in principle no focusing optics is needed to image the microspot (38). Nevertheless, if needed, a simple focusing optics to alter the magnification of the image of the microspot (38) and surrounding WE (39) surface may be implemented between BS1 (44) and the camera (45). Once the optics is aligned and optimized, the BS1 (44) may be removed from the beam path. The insertion and removal of BS1 (44) may not affect the alignment of the reflectometer.

The electrochemical setup on the sample using a potentiostat (46) with the three electrodes, WE, RE, and CE, is similar to the description above. The probe potential is applied via a power supply (47) at a frequency, ω, as described above. The ramp potential (if required) is applied by the potentiostat as described above. Those of ordinary skill in the art will appreciate that the ramp potential may also be via an external power supply connected to the potentiostat (46).

The reflected beam from the WE (38), also at an angle θ with respect to the normal, is incident on the steering mirror (34) at the same spot as the incident beam. The reflected beam may be refracted by a lens (48) and deflected to the detector via a mirror (49). The lens (48) may be focused on the steering mirror to make the reflected beam path parallel to the incident beam path. As the parallel incident and reflected beam paths may be close, the mirror (49) may be a half-mirror. The deflected beam from the mirror (49) is split into two linearly polarized beams, A (51) and B (52), using a biaxial crystal (50). The two beams, A (51) and B (52), are linearly polarized with mutually perpendicular polarizations. The intensities of the two beams are measured individually on a set of two detectors (53). The detectors are typically photodetectors connected to their respective amplifiers to convert the photocurrent to a signal in the form of potentials. The DC signal from the amplifier may be directly input to the computer as incident beam intensity, I. The oscillating potential signal is amplified in the lock-in amplifier (54) referenced at probe-potential frequency, ω, by connecting the amplifier to the power supply (47). The data is acquired by the computer (55) that analyzes the signals, as discussed above. To avoid unnecessary complexity in the schematic (FIG. 3), as those of ordinary skill in the art will appreciate, the computer (55) may regulate the (galvo) mirror (35), measure the intensity of the of the incident laser, I, from the detectors (53), and directly interface with the potentiostat (46) to regulate the ramp potential and acquire data. Furthermore, the potentiostat (46) may be connected to the power supply (47) to apply regulated probe potential on the WE (39).

Two kinds of data sets (56) are possible depending on the nature of the oscillatory potentials. As discussed above, when the oscillatory potential on the WE (39) is a combination of probe potential that may be applied by an external power supply (47) and a ramp potential that may be applied internally from the potentiostat (46), the output data from the computer are I, $D_1$, $\phi_1$, $D_2$, and $\phi_2$. As discussed above, when the oscillatory potential on the WE (39) is just the probe potential that may be applied by an external power supply (47), the output data from the computer are I, $D_{1,n}$, $\phi_{1,n}$, $D_{2,n}$, and $\phi_{2,n}$. As described above, from the data set (56), the optical parameters, (R, $\phi$, P, α) or (R, P, α), may be obtained as a function of E, respectively.

Figure 4:
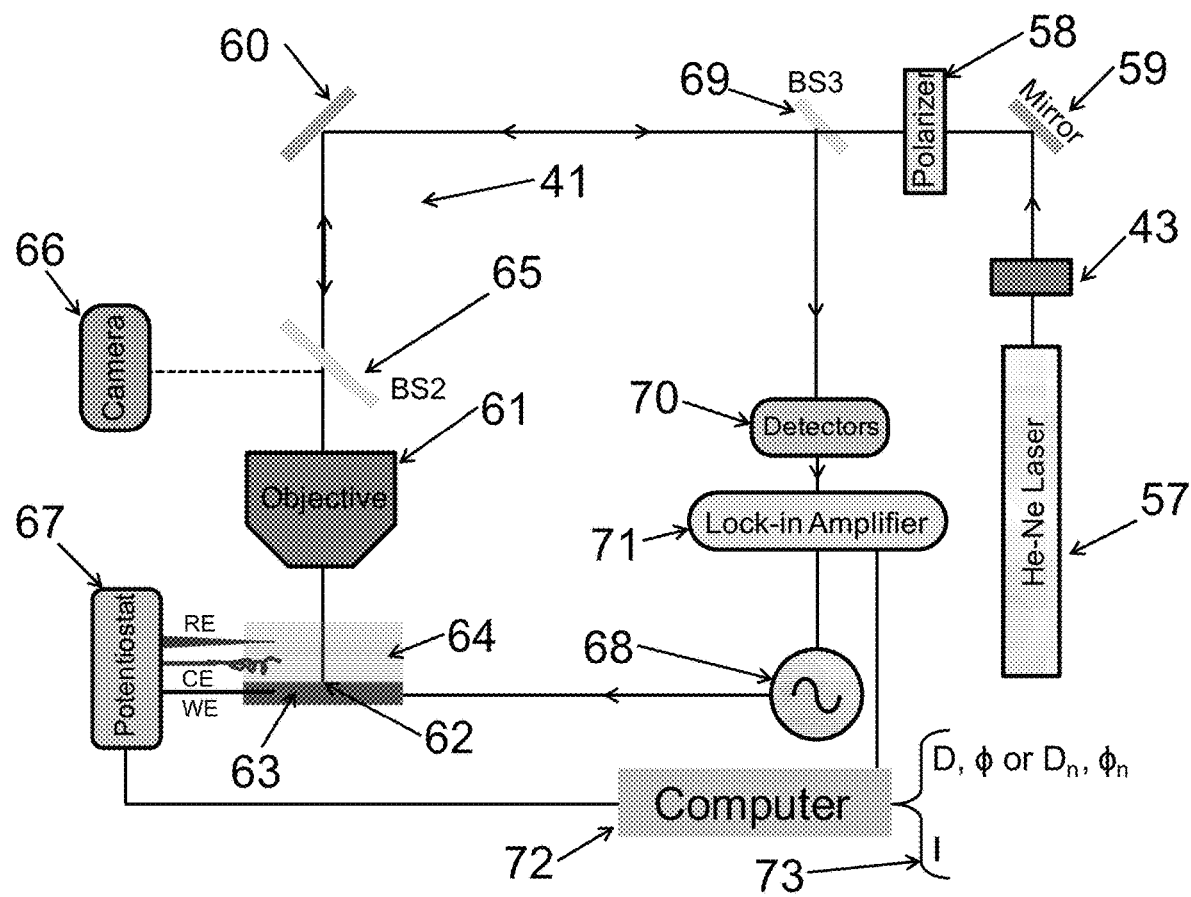
FIG. 4: Details of the differential reflectometer with complete electrochemical setup for the second family of devices with θ=0 to operate the device in modes (iii) and (iv).

The second family of devices is illustrated using a typical setup shown in FIG. 4. Notwithstanding any limitation, the specific setup is merely used to demonstrate the operation of the device. Those of ordinary skill in the art, will appreciate that alternative optical setup or a modification of the described setup may be used to ultimately measure the optical parameters, I, D, and $\phi$ or I, $D_n$, and $\phi_n$, where the former set of parameters is for both probe and ramp potential and the latter is for only the probe potential. The laser (57) used is a He—Ne laser for convenience to illustrate the concept of the device. Those of ordinary skill in the art will appreciate that other lasers may be used. A continuous laser with a wave length in the visible region is more convenient. The laser may be linearly polarized by incorporating a polarizer (58) in the beam path.

The laser beam may be steered through a set of mirrors (59,60) through focusing optics, such as a microscope objective (61), to focus the beam on a microspot (62) on the WE (63) in contact with solution (64). The WE (63) may be modified and patterned, as described above; and the solution (64) may be a complex mixture of chemicals depending on the applications, as described above. To avoid confusion in the schematic, the details on the other components of the sample, such as modification on the electrode, the chamber to hold the solution (59), and the window for the laser to enter and exit the solution chamber, are not shown.

To make the focus of the microspot (62) tight for better performance, the focusing optics (61)) may have a high numerical aperture (NA). Depending on the working distance available, an NA as high as possible (0.5) is optimum. Typically, NA>0.3 may be used. Those of ordinary skill in the art will appreciate that the larger the diameter of the incident beam before the objective lens, the sharper the microspot (62) will be. Usually, the working distance reduces as the NA and magnification increases. Thus, the size of the microspot that is preferred is as small as possible. A compromise between the working distance and NA will have to be made. Those of ordinary skill in the art will appreciate that long working distance objectives are also commercially available.

The location of the laser spot on the WE (62) may be visualized by an in-built microscope. A beam splitter, BS2 (65), may be temporarily inserted in the beam path to partially deflect the light on a camera to image the microspot (62). As the beam is parallel, those of ordinary skill in the art would appreciate that, in principle, no focusing optics are needed to image the microspot (62). Nevertheless, if needed, simple focusing optics to alter the magnification of the image of the microspot (62) and surrounding WE (63) surface may be implemented between the BS2 (65) and the camera (66). Once the optics are aligned and optimized, the BS3 (65) may be removed from the beam path.

The electrochemical setup on the sample using a potentiostat (67) with the three electrodes, WE, RE, and CE, is similar to the description above. The probe-potential is applied via a power supply (68) at a frequency, ω, as described above. The ramp potential (if required) is applied by the potentiostat, as described above. Those of ordinary skill in the art will appreciate that the ramp potential may also be via an external power supply connected to the potentiostat (67).

The reflected beam from the WE (63) that retraces its path after the steering mirror (60) may be deflected via a beam splitter, BS3 (69), to a detector (70). The detector is typically a photodetector connected to an amplifier to convert the photocurrent to a signal in the form of potential. The DC component of the potential is incidence intensity, I. The potential signal is amplified in the lock-in amplifier (71) referenced at the probe potential frequency, ω, by connecting the amplifier to the power supply (68). The data is acquired by the computer (72) that analyzes the signals, as discussed above. To avoid unnecessary complexity in the schematic (FIG. 4), as those of ordinary skill in the art will appreciate, the computer (72) may record the intensity of the of the incident intensity of the laser, I, from the detector-amplifier. The computer (72) may directly be interfaced with the potentiostat (67) to regulate the ramp potential and acquire data. Furthermore, the potentiostat (67) may be connected to the power supply (68) to apply regulated probe potential on the WE (63).

Two kinds of data sets (73) are possible depending on the nature of the oscillatory potentials. As discussed above, when the oscillatory potential on the WE (63) is a combination of probe potential that may be applied by external power supply (68) and a ramp potential that may be applied internally from the potentiostat (67), the output data from the computer are I, D, and ϕ. As discussed above, when the oscillatory potential on the WE (63) is a just the probe potential, i.e., ω-scan, that may be applied by external power supply (68), the output data from the computer are I, $D_n$, and $ϕ_n$. As described above, from the data set (73), the optical parameters, R and ϕ or just R may be obtained as a function of E, respectively.

The illustrations in FIG. 3 and FIG. 4 collectively demonstrate the concept of differential reflectometer to map multiple redox reactions on a working electrode. The specific optical and electronic setups are not unique designs to measure the four sets of data. The four sets of data corresponding to each mode are (I, $D_1$, $ϕ_1$, $D_2$, $ϕ_2$), (I, $D_{1,n}$, $ϕ_{1,n}$, $D_{2,n}$, $ϕ_{2,n}$), (I, D, ϕ), and (I, $D_n$, $ϕ_n$) to obtain (R, ϕ, P, α), (R, P, α), (R, ϕ), and (R), respectively. Connecting the invented differential reflectometer device to an electrical system, an example described in FIG. 2, describes the complete system to measure local redox reaction on a WE. Furthermore, the electrode assembly may be scanned horizontally to measure redox reaction at various microspots on a WE.

EXAMPLES

Example 1: Redox of $Fe(CN)_6]^{4-/3-}$ in Solution on a Au Electrode

Figure 5A:
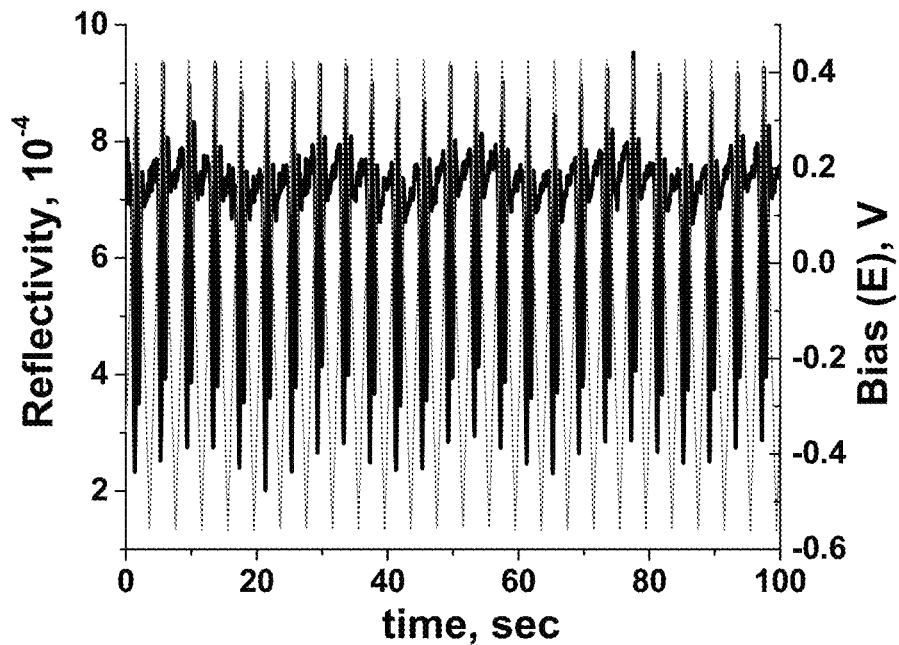
FIGS. 5a, 5b, 5c, 5d and 5e: Typical data obtained for operation in mode (iii) with redox ion in the solution (Example 1).
Figure 5B:
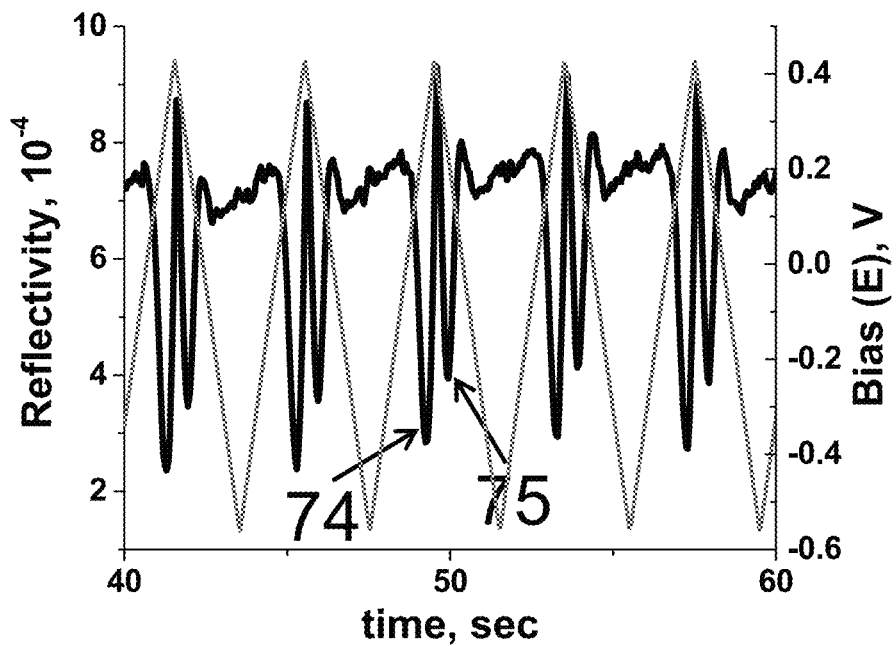
Figure 5C:
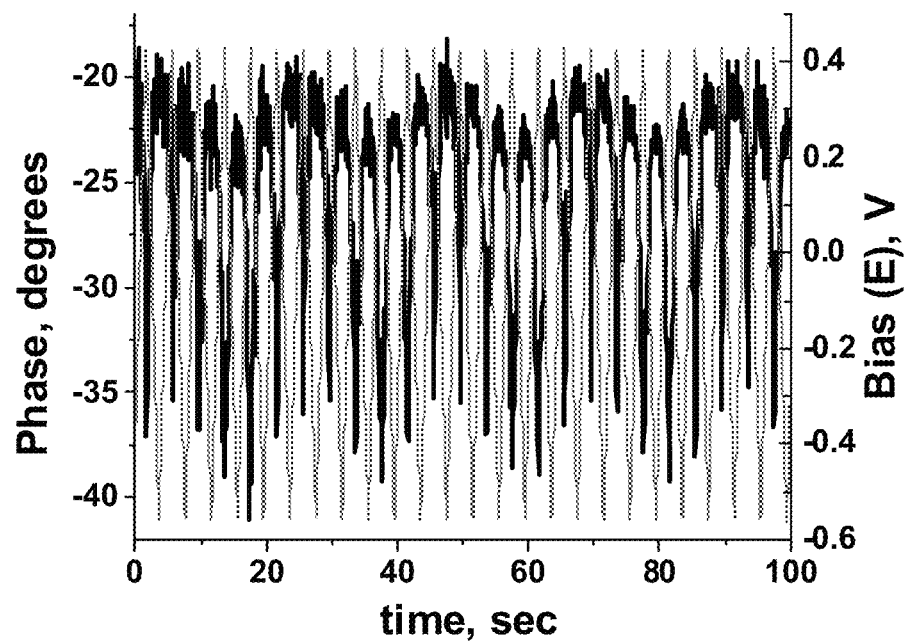
Figure 5D:
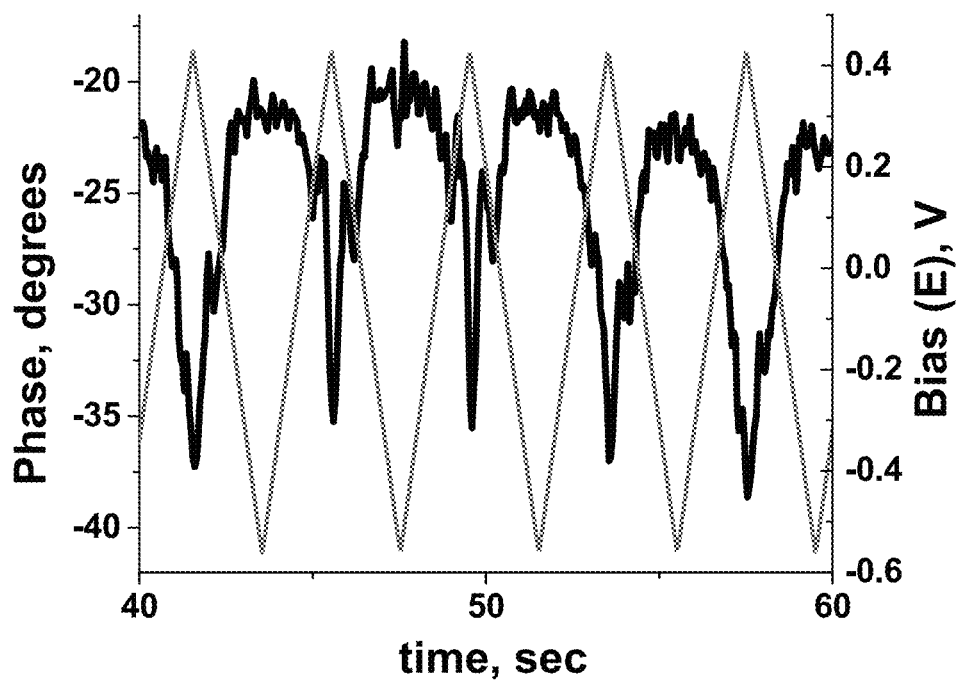
Figure 5E:
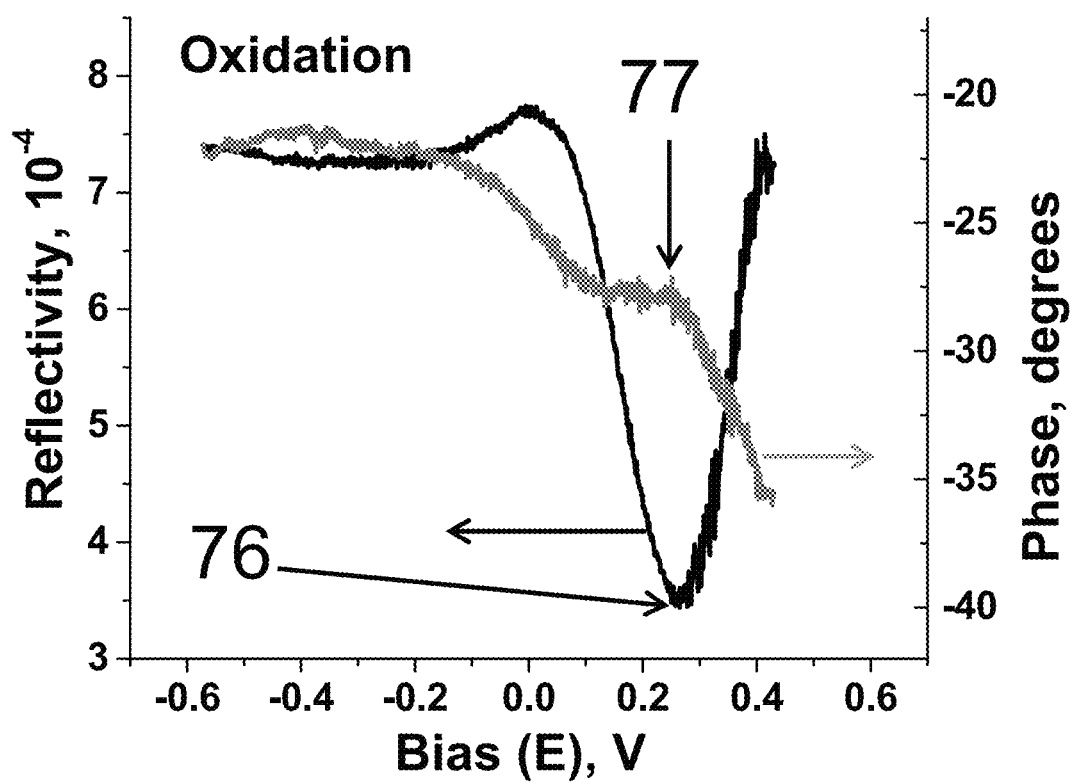

An example is given using the differential reflectometer in mode (iii) where θ=0 and both the ramp potential and probe potential are applied. The ramp potential is a "V-shaped" potential shown as the grey line in FIG. 5(a) with the right-hand side y-axis. The ramp potential is more apparent in the magnified view (FIG. 5(b)), where the ramp potential, similar to FIG. 5(b), is the grey line with the vertical axis on the right-hand side. The ramp potential is nominally between −0.58 and 0.4 V. The probe-potential is at ω=2 KHz and an amplitude of 100 mV. The electrode is Au. The redox ion is 50 mM of $K_4[Fe(CN)_6]$ in water. The raw data over 100 seconds shows several scans (FIG. 5(a)). In the magnified view, the reflectivity, R, dips sharply at oxidation (74) and reduction (75), respectively, as apparent in each of the five cycles (FIG. 5(b)). The corresponding phase angle, ϕ, for all of the scans (FIG. 5(c)) and the magnified scan (FIG. 5(d)) show a weak peak at the redox reaction potentials. All of the scans are superimposed and averaged to calculate E versus R (FIG. 5(d)). The left- and right-hand vertical axes are R and ϕ, respectively. Only the oxidation process is shown in FIG. 5(b). The reduction characteristics are similar, as apparent from FIG. 5(b). The R significantly decreases to a minimum (76) in the region of E where oxidation of the ion occurs on the WE. There is a small corresponding local peak (77) for ϕ. The R is on the order of $10^{-4}$ or 0.01%. The example indicates the viability of a differential reflectivity device to measure R and ϕ and the ability to measure the redox reaction of the ions in the solution.

Example 2: Adsorbed MB on a Au Electrode with a Measurement in 100 mM NaCl

Figure 6A:
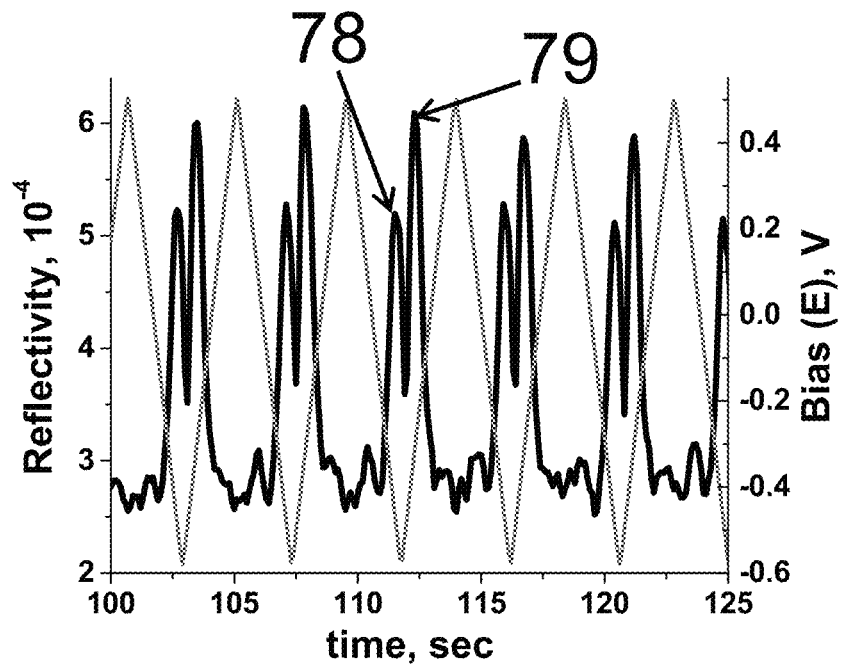
FIGS. 6a, 6b and 6c: Typical data obtained for operation in mode (iii) with redox ion adsorbed on the electrode (Example 2).
Figure 6B:
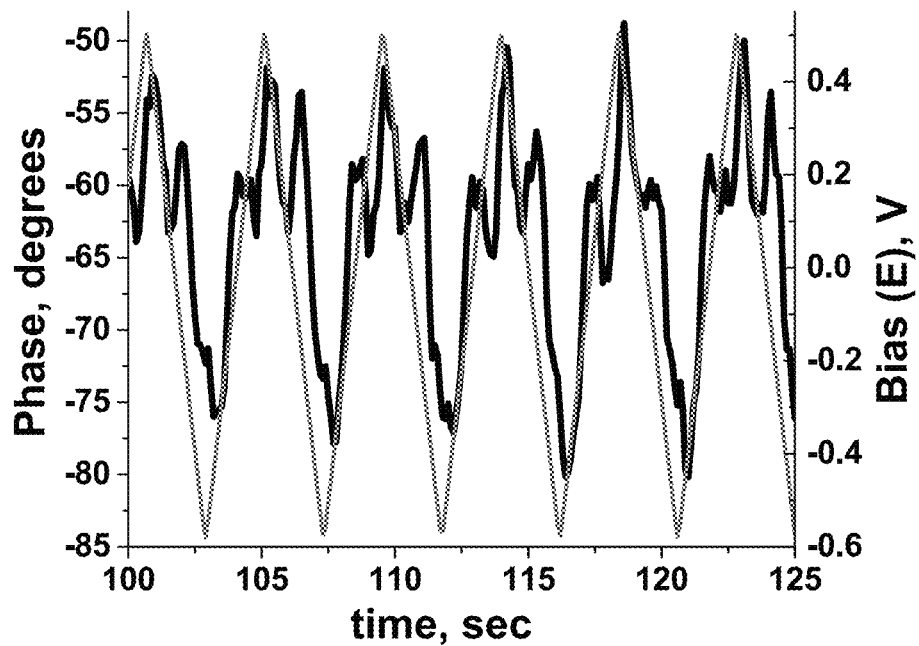

An example is given using the differential reflectometer to measure the redox of adsorbed ions. The measurement is performed in mode (iii) where θ=0 and both the ramp potential and probe potential are applied. A 1 mM solution of MB is exposed to the WE for 12 hours to adsorb MB on a Au electrode. The electrode is then washed vigorously. The differential reflectivity measurement is performed in 100 mM NaCl solution with no MB in the solution. Scans are performed for about 200 seconds, similar to FIG. 5(a). A small portion of the scan for 25 seconds is shown (FIGS. 6(a) and (6(b)). The axes of FIGS. 6(a) and 6(b) are similar to the axes in FIGS. 5(b) and 5(d), respectively. The probe potential is at ω=2 KHz and an amplitude of 100 mV. The peaks due to oxidation (78) and reduction (79) of MB are clearly observed in the differential reflectivity measurement (FIG. 6(a)). Maximum reflectivity is exhibited due to the oxidation of MB (80) in E versus R data averaged over 100 scans. Similar to Example 1, the reflectivity is on the order of 0.01%. The example demonstrates the ability of the differential reflectometer to measure the redox from adsorbed ions.

Example 3: Redox on dsDNA in MB and $K_4[Fe(CN)_6]$ Solution

Figure 6C:
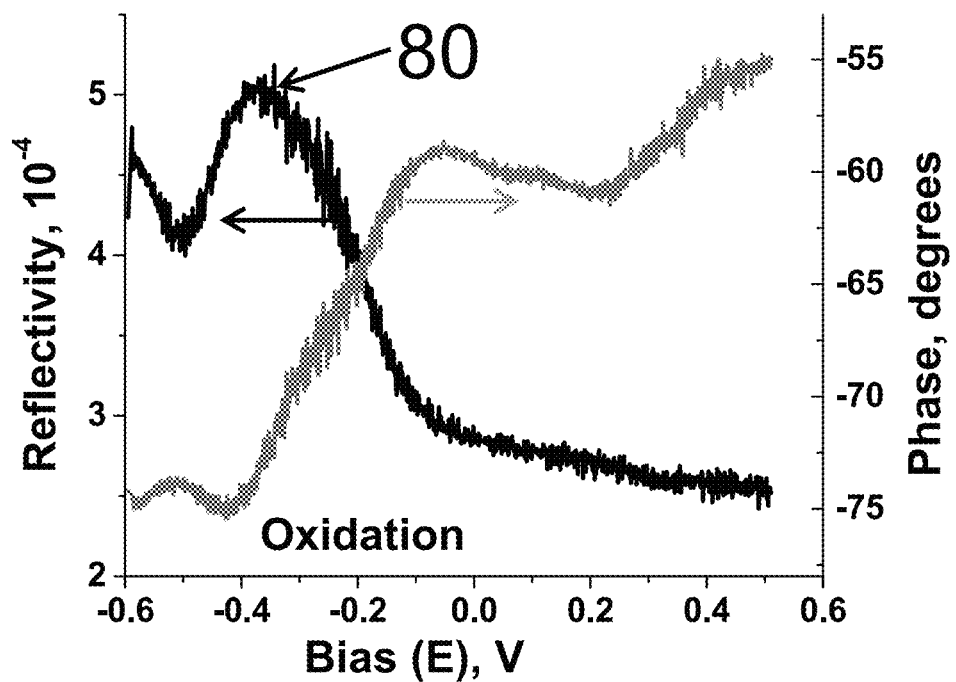
Figure 7A:
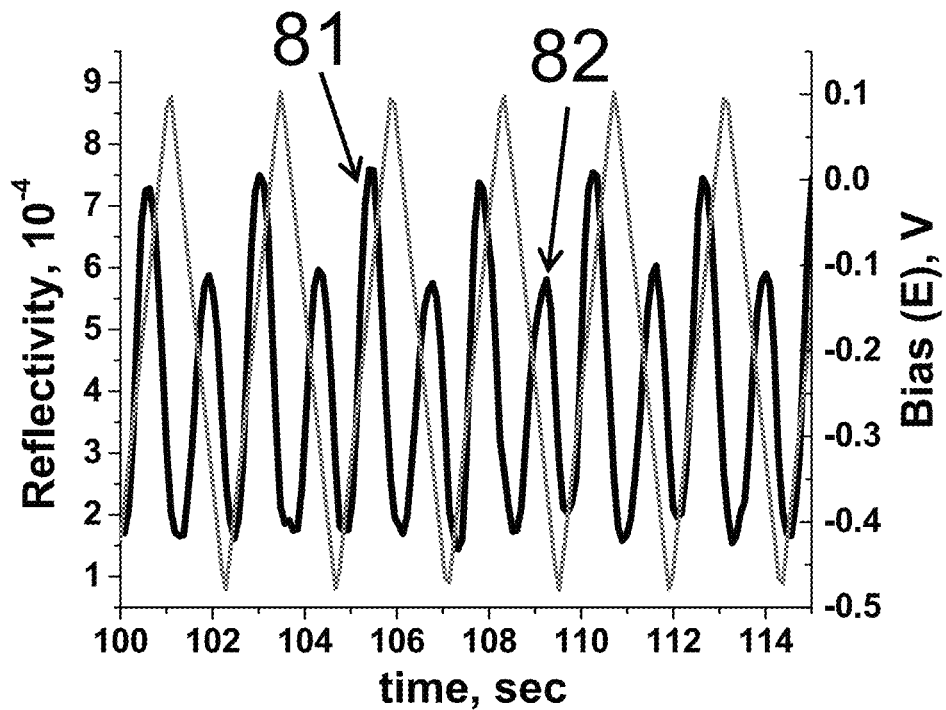
FIGS. 7a. 7b and 7c: Typical data obtained for operation in mode (iii) with electrode modified with tethered monolayer of dsDNA and the ions, that under redox reaction bind to the dsDNA which is mediated by redox ions in the solution (Example 3).
Figure 7B:
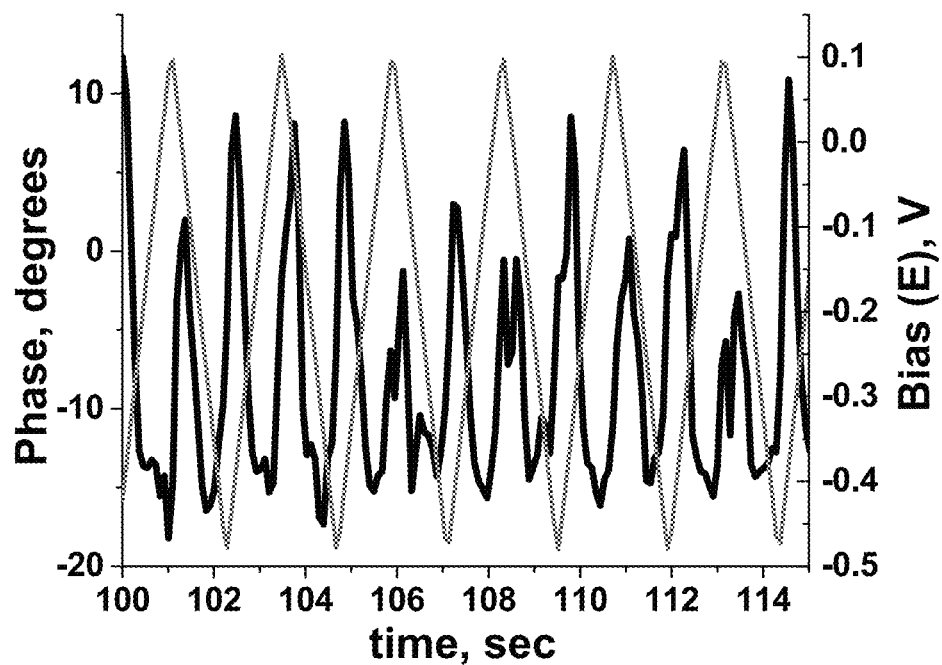
Figure 7C:
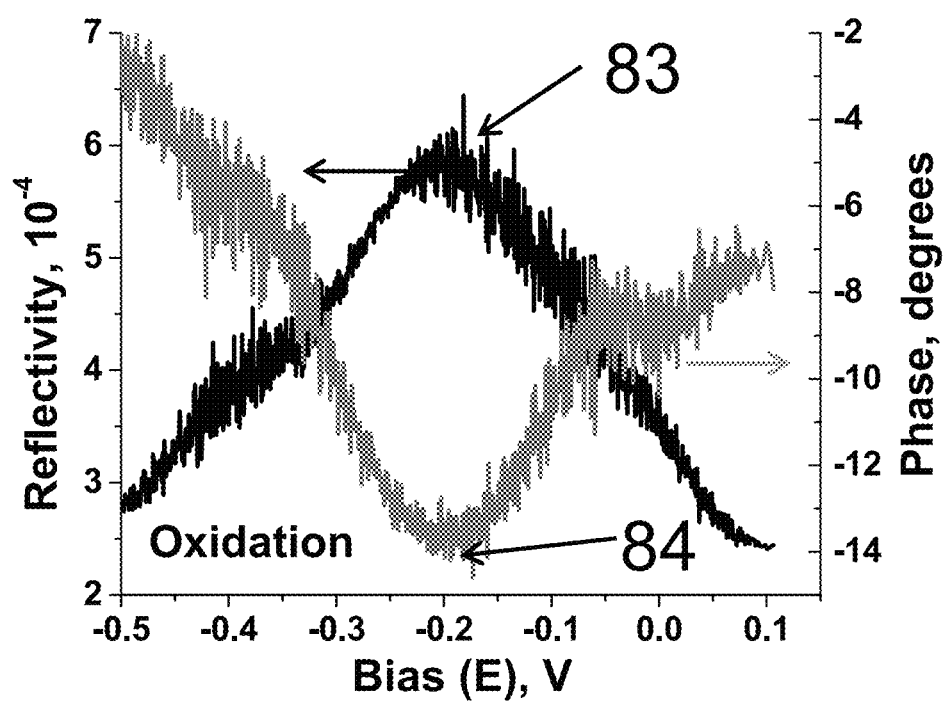

An array of 50 μm microspots are etched in a photoresist film deposited on a Au WE using photolithography. Double-stranded DNA (dsDNA) with 23 base pairs are immobilized on the underlying exposed electrode in at least one of the 50 μm etched holes. To immobilize the dsDNA, one of the strands has a thio-group to allow the molecule to be tethered at one end to the WE via a Au—S bond. The immobilization is performed by exposing the underlying Au electrode in the microspot to 5 μM of solution of the dsDNA in 1 M of phosphate buffer for 4 hours. Subsequently, the sample is vigorously washed in RANase-free water. The Au electrode with open sites, not filled with dsDNA, is filled with MCH. Those of ordinary skill in the art will appreciate that MCH passivates the rest of the electrode for any redox reaction; as a result, MB redox can only occur by electron transport via the dsDNA. The differential reflectometry measurement is performed in 100 mM of phosphate buffer with 15 μM MB and 50 mM $K_4[Fe(CN)_6]$. The measurement is performed in mode (iii), i.e., θ=0; and both ramp and probe potential are applied. The probe potential frequency, ω, is 500 Hz; and the amplitude is 100 mV. The ramp potential shown in FIGS. 7 (a) and 7(b) is similar to FIGS. 6 (a) and 6(b), respectively. Similar to Example 2, only a small time interval consisting of a 200-second-long measurement is shown in FIGS. 7(a) and 7(b). The region is typical of the other parts of the scan. The reflectivity shows the oxidation (81) and reduction (82) peaks of the MB attached to the dsDNA strands. MB binds to the dsDNA, and the redox reaction is mediated by $Fe(CN)_6]^{4-/3-}$ such that the redox electron is reported to be conducting through the dsDNA chain.[8] The R and ϕ, as a function of E, for the oxidation process are shown in FIG. 7(c). A peak (83) is observed in the reflectivity close to the redox potential. The phase, ϕ, exhibits a minimum (84) close to the redox potential. The example demonstrates that differential reflectivity can measure the redox of MB that binds to immobilized dsDNA. The ion $Fe(CN)_6]^{4-/3-}$ in the solution mediates the redox of MB.

Figure 8A:
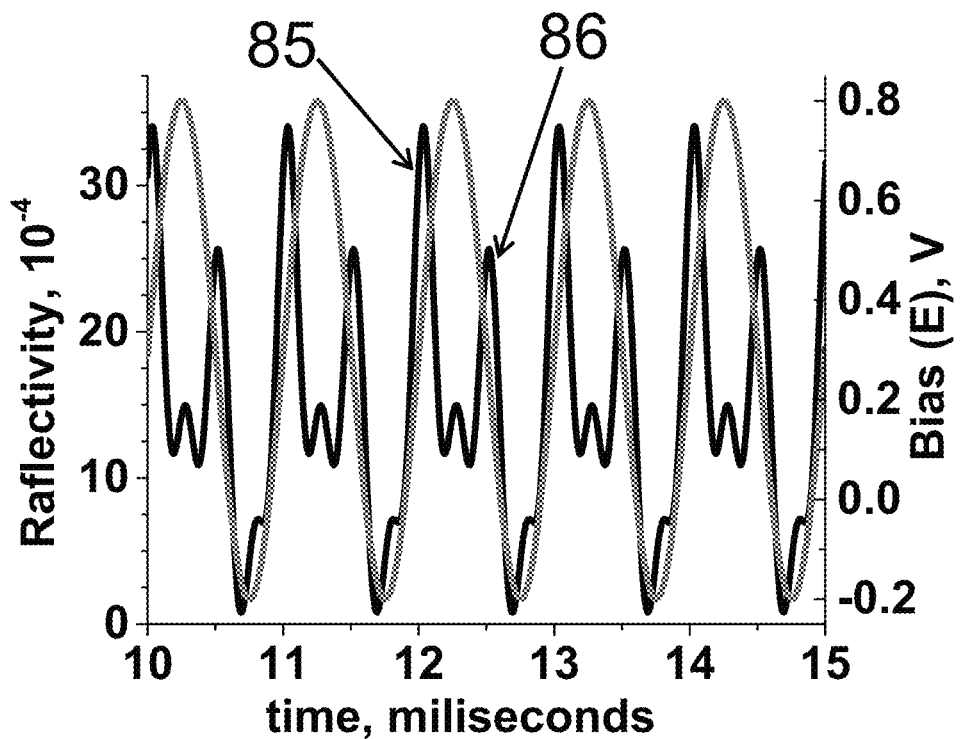
FIGS. 8a and 8b: Typical data obtained for operation in mode (iv) with redox ion incorporated in surface modified layer of polyelectrolyte deposited on the electrode (Example 4).
Figure 8B:
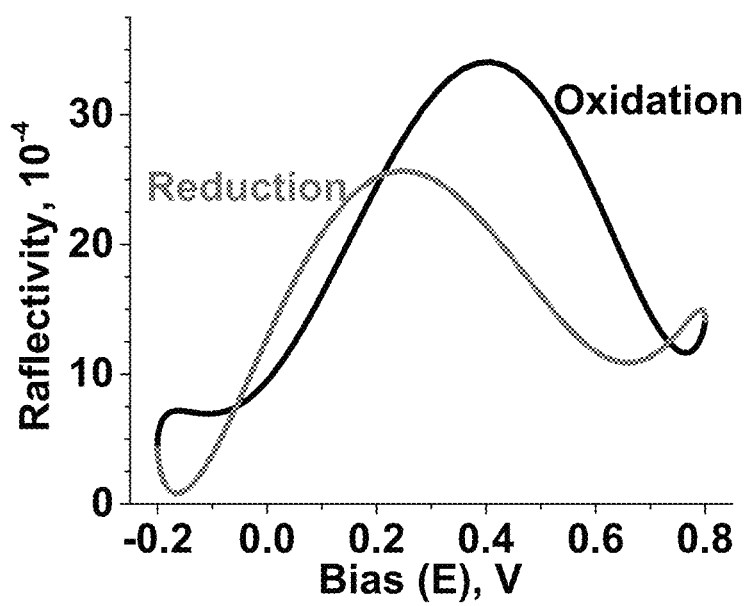
Figure 9:
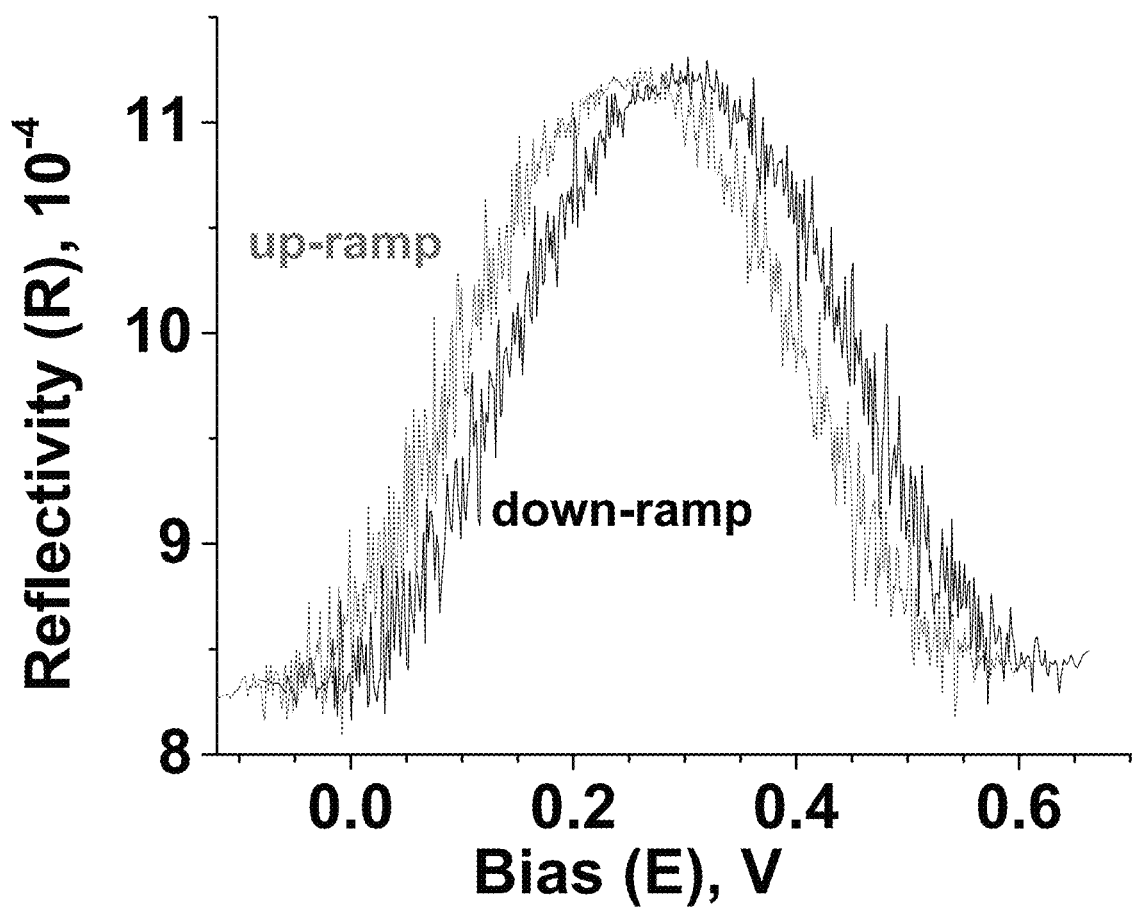
FIG. 9: Typical data obtained for operation in mode (iii) with no redox reaction in the solution and no modification of the electrode.

Example 4: ω-Scan of Imbedded $[Fe(CN)_6]^{4-/3-}$ Ions in a PAH-Modified Au Electrode An aqueous solution of PAH is spun cast on a Au electrode followed by a vigorous wash with water. The chip is immersed in 100 mM of $K_4[Fe(CN)_6]$ solution. The electrode is subjected to 600 CV cycles with "V-shaped" potential from −0.2 to 0.8 V at a ramp rate of 250 mV/s. Details on a similar sample preparation with a different CV ramp rate and number of cycles is described in the literature.[6,7] After vigorous washing in water, differential reflectometry is performed in 100 mM NaCl. Only the probe potential is applied at 1 KHz, i.e., ω-scan. The amplitude of the probe potential is 0.5 V. The oscillations are around a DC level of 0.3 V which is nominally the $E^O$ for $Fe(CN)_6]^{4-/3-}$ redox. The first five harmonics with an amplitude and phase of ($4.42308\times10^{-4}$,10), ($4.80769\times10^{-4}$,30), ($1.92308\times10^{-5}$, 37), ($1.73077\times10^{-4}$,16) and ($3.46154\times10^{-4}$,16), respectively, are measured by the differential reflectometer. The R scan is simulated by adding the Fourier components. The simulated reflectivity (in black) and applied probe-potential (in grey) are shown in FIG. 8(a), the left and right vertical axes are R and E, respectively. The origin of time axes is arbitrary. The oxidation (85) and reduction (86) of $Fe(CN)_6]^{4-/3-}$ imbedded in PAH is clearly observed. The simulated R, as a function of E, shows the oxidation and reduction maxima are consistent with $E^O$ for $Fe(CN)_6]^{4-/3}$ (FIG. 8(b)). The redox behavior is measured at 1 KHz in contrast to ~1 Hz range in Example 1 where both ramp and probe potentials are applied. The ω-scan demonstrates that the differential reflectometer can measure redox reactions at a significantly higher speed.

Example 5: Reflectivity for System with No Redox

The bare Au electrode (WE) is exposed to 100 mM of aqueous NaCl solution. The ramp-potential on the WE is from −0.1 to 0.6 V. The amplitude of probe-potential is 200 mV. The reflectivity (R) clearly shows a maximum during the up-ramp (87) and down-ramp (88). No redox reaction occurs. The maximum in R corresponds to the potential of zero charge (PZC). At the maximum the charge in the EDL is stripped to its maximum. Those of ordinary skill in the art will appreciate that PZC signifies the difference in Femi level between the solution and the electrode. The example demonstrates that the modulation in differential reflectivity may be due to electrochemical events that do not necessarily involve a redox reaction.

The five examples demonstrate the capability of the method in a variety of electrochemical systems. The examples should not be construed as limiting but rather as an aid to demonstrating the versatility of the invented device and a method for measuring interfacial redox reactions under different conditions. The examples allow those of ordinary skill in the art to design a multitude of different applications for the device to probe localized electrochemical processes using local differential reflectivity to quantify the reaction by measuring the four optical parameters, R, ϕ, P, and α, or their subset, as a function of E. The ability to measure more than one electrochemical process on a patterned electrode by scanning allows the invented differential reflectometer to perform combinatorial electrochemical analysis. It is understood that E is an oscillating potential that may be acting alone on the WE or in combination with other potential, such as ramp potential.

The electrochemical differential reflectometer has many applications, such as analysis of multiple analytes in the solution, immunospecific binding to a multitude of different types of molecules immobilized on the electrode, and kinetics of heterogeneous reaction rates at the electrode surface. The device may be used for analysis and diagnostics in the fields of medicine, water quality assurance, food safety, forensics, and applied and fundamental research in electrochemistry.

The invention claimed is:
1. An instrument to measure an electrochemical process in a liquid comprising:
a) an electrode immersed in the liquid, the electrode having a reflective surface;
b) an electronic module configured to apply a ramp potential at a frequency $\omega_R$ with respect to the liquid to the electrode;
c) a power supply configured to apply a probe potential superimposed on the ramp potential with respect to the liquid, at a predetermined frequency ω to the electrode to cause the ions at the interface of the electrode to oscillate at ω, wherein ω is greater than $\omega_R$;
d) a single light source and optical system which directs a single polarized light beam incident on the surface of the electrode so that amplitude of the beam and the polarization of the single light beam reflected from the reflective surface of the electrode oscillates at probe frequency ω;
e) at least one photodetector which measures the amplitude of the oscillating intensity of the light reflected from the reflective surface of the electrode at the frequency of oscillation w as a function of base potential that is varying at a significantly slower frequency $\omega_R$;
f) a computer processor having a data acquisition module to obtain the measured oscillation intensity signal from the photodetector and programmed to analyze the measured oscillation intensity signal to determine at least one parameter of the electrochemical process as a function of the ramp potential; and
g) the computer processor is configured to interface with the electronic module and further programmed to apply the ramp potential to synchronize the ramp potential with the measured oscillation intensity obtained from the photodetector.

2. The instrument to measure an electrochemical process as claimed in claim 1 wherein the optical system for directing a single polarized light beam on the surface of the electrode and the at least one photodetector for measuring the amplitude of the oscillating intensity of the beam and the polarization of the single light beam reflected from the reflective surface of the electrode comprise a differential reflectometer.

3. The instrument to measure an electrochemical process as claimed in claim 1 wherein the module for applying the ramp potential and an oscillating potential, at a predetermined frequency, to the electrode comprise a potentiostat to cause at least one of: oscillation at ω in a) intensity and b) polarization of the reflected beam, when the incident beam impinges on the electrode surface.

4. The instrument to measure an electrochemical process as claimed in claim 1 further including an optical system for steering the light beam in at least one direction.

5. The instrument to measure an electrochemical process as claimed in claim 1 wherein the light source is a laser.

6. The instrument to measure an electrochemical process as claimed in claim 1 wherein the frequency $\omega_R$ of the base potential is 2 to 100 fold slower than frequency ω of the oscillating potential.

7. The instrument to measure an electrochemical process as claimed in claim 1 further including a lock-in-amplifier tuned at probe frequency, $\omega$ to measure the intensity of reflected light oscillating at frequency $\omega$ by the photodetector.

8. The instrument to measure an electrochemical process as claimed in claim 1 wherein the electronic module for measuring the oscillation of intensity of the single light beam reflected from the reflective surface of the electrode at the frequency of oscillation $\omega$ of the applied oscillating potential comprise amplifying the signal from the photodetector by a lock-in amplifier tuned at reference frequency of $\omega$.

9. The instrument to measure an electrochemical process as claimed in claim 1 further including an optical system for adjusting the angle of incidence of the single light beam on the reflective electrode.

10. The instrument to measure an electrochemical process as claimed in claim 1 further including a biaxial crystal to split the single polarized reflected light from the electrode into two beams with mutually perpendicular polarization for measuring the oscillation in ellipticity of the reflected light at $\omega$ with respect to the incident polarized light using two photodetectors to measure the respective intensities of the two beams.

11. The instrument to measure an electrochemical process as claimed in claim 1 wherein the surface of the electrode is patterned exposing select areas of the electrode while passivating the rest of the electrode with an insulating layer.

12. The instrument to measure an electrochemical process as claimed in claim 11 wherein the exposed area includes electrochemically active moieties.

13. The instrument to measure an electrochemical process as claimed in claim 1 wherein frequency $\omega_R$ of the base potential is at least 10 fold slower, preferably more than 100 fold slower than frequency $\omega$ of the oscillating potential.

* * * * *